J. M. DODGE.
PROCESS OF MAKING CHAIN LINKS.
APPLICATION FILED JAN. 17, 1908.
925,804.
Patented June 22, 1909.
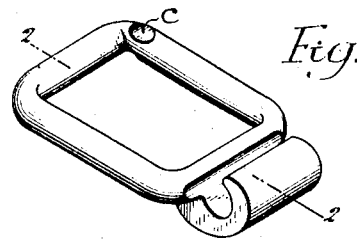
Fig. 1.
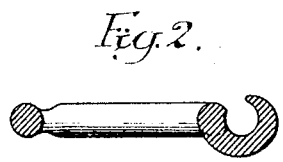
Fig. 2.
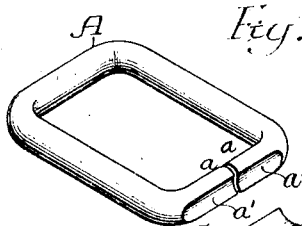
Fig. 3.
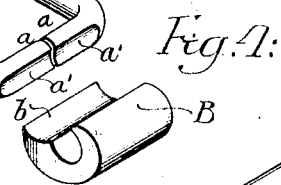
Fig. 4.
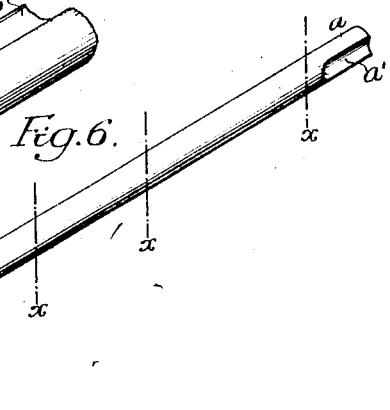
Fig. 5.
Fig. 6.
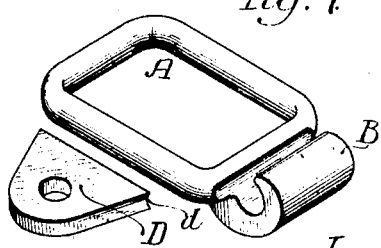
Fig. 7.
Witnesses:
Willa A. Burrows
Titus K. Grove
Inventor
James M. Dodge
by his Attorneys

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

PROCESS OF MAKING CHAIN-LINKS.

No. 925,804.  Specification of Letters Patent.  Patented June 22, 1909.

Application filed January 17, 1908. Serial No. 411,339.

*To all whom it may concern:*

Be it known that I, JAMES M. DODGE, a citizen of the United States, residing in Philadelphia, Pennsylvania, have invented certain Improvements in the Process of Making Chain-Links, of which the following is a specification.

The object of my invention is to make an open rectangular detachable chain link from wrought metal rods or shapes welded together, as fully described hereafter.

In the accompanying drawing:—Figure 1, is a perspective view of a completed chain link made in accordance with my invention; Fig. 2, is a longitudinal sectional view of the link on the line 2—2, Fig. 1; Fig. 3, is a detached perspective view of the open link section before welding; Fig. 4, is a detached perspective view of the hook section before welding; Fig. 5, is a perspective view of the rod or shape from which the hook sections are cut; Fig. 6, is a view showing the rod from which the link sections are bent; and Fig. 7, is a view showing the method of applying attachments to the links.

Open rectangular detachable chain links have heretofore been made in a single piece and of malleable iron, and great care must be exercised in manufacturing these links so as to detect the presence of any blow-holes or other defects in the castings before they are used. In making the link from wrought metal rods or shapes, the above defects are entirely avoided and if the weld is properly made a very strong link is the result and one that is free from flaws or other defects.

A is the open rectangular body portion of the link having side and end bars and made from a rod, as illustrated in Fig. 6, bent at the points $x$ so that the abutting ends $a$, $a$ will be at the point where the hook B is welded to the link. The rod is preferably flattened or grooved at $a'$ at each end so that when the parts of the link are assembled the grooved portions of the link will form the rear wall of the socket. The hook section B, Fig. 4, is also preferably made from a rod of rolled shape, Fig. 5; the rod being rolled with a longitudinal groove $b'$ therein to form the socket and having a concave portion $b$ to fit the body portion of the link. The rod is cut in lengths equal to the width of hook desired; the hook being shaped to properly engage the cross bar of an adjoining link. The parts are united preferably by the electrically welding process, which will firmly unite the hook section to the body portion, and the abutting ends of the link sections may also be united, the hook section forming a bridging piece to strengthen the joint. The grooves $a'$ at one end of the body portion complete the socket in the hook section. This method of welding makes a very substantial link and one which will stand the severe strains to which links of this type are subjected.

Depressions are made in the link at $c$, $c$, in the present instance, to allow for the ready coupling or uncoupling of the links. These depressions can be made either after the link has been bent into shape, as in Fig. 1, or in the blank, as shown in Fig. 6.

An attachment of any suitable shape may be secured to the link A by electric or other welding, as illustrated in Fig. 7, in which is shown a flat attachment D having a concave portion $d$ shaped to fit against the rounded side member of the link A. Thus the links can be carried in stock and any suitable attachments can be applied as called for.

Thus it will be seen by the above description that I can manufacture an open rectangular detachable link very cheaply, and one which will be more substantial than the present malleable iron links now universally used.

The links can be made of any size desired and the hook sections can be readily rolled or drawn in lengths and cut as required.

I claim:—

1. The process herein described of making a detachable chain link of the class specified, said process consisting in bending a rod to the desired shape to form a body portion having side and end bars, making a hook section, fitting a portion of the hook section to one of the end bars of the body of the link, and uniting the parts by welding.

2. The process herein described of making a detachable chain link of the class specified, said process consisting in bending a rod to the desired shape to form the body portion having side and end bars, with the abutting ends of the rod at one end of the body portion, making a hooked section having a concaved surface, applying said concaved surface of the hooked member to the end bar at which the ends of the rod abut, and uniting the parts by welding.

3. The process herein described of making links of the type described, said process consisting in bending a rod to form a body portion having an open center, longitudinally grooving a rod to form the socket of the hook section, cutting the last mentioned rod in lengths to form the hook members, and then uniting the said severed sections to the body portion by welding, forming a chain link with a hook at one end.

4. The process herein described of making a detachable quadrangular open link, said process consisting in grooving a rod at each end, bending the rod to form the body portion of the link, the abutting ends of the rod being at one end and the grooves in alinement, applying a hook section to the end bar at which the ends of the rod abut, the grooves in the body portion forming part of the wall of the socket, and uniting the parts by welding.

In testimony whereof, I have signed my name to this specification, in the presence of two subscribing witnesses.

JAMES M. DODGE.

Witnesses:
 WM. A. BARR,
 JOS. H. KLEIN.